United States Patent [19]

Wakasa et al.

[11] Patent Number: 4,774,140
[45] Date of Patent: Sep. 27, 1988

[54] GLASS-LIKE CARBON MATERIAL, METHOD FOR MANUFACTURING THE SAME, AND SLIDER PART FOR USE WITH A RECORDING MEDIUM

[75] Inventors: Masanobu Wakasa; Michihide Yamauchi, both of Wakayama; Nobuyuki Kishine, Utsunomiya; Tetsuya Imamura, Tokyo, all of Japan

[73] Assignee: KAO Corporation, Tokyo, Japan

[21] Appl. No.: 893,714

[22] Filed: Aug. 6, 1986

[30] Foreign Application Priority Data

Aug. 6, 1985 [JP] Japan ................................ 60-173748

[51] Int. Cl.$^4$ ........................ B32B 9/00; G11B 5/187; C01B 31/00
[52] U.S. Cl. .................................... 428/408; 264/29.6; 423/449; 423/414; 360/122; 360/126; 360/127; 501/40
[58] Field of Search ................ 428/408; 501/11, 40, 99; 65/32, 374.15; 264/29.1, 29.6, 29.7; 423/414, 447.1, 447.2, 447.4, 447.7, 447.8, 447.9, 449; 360/122, 125, 126, 127

[56] References Cited

U.S. PATENT DOCUMENTS

| 4,166,145 | 8/1979 | Hatch et al. .................. 264/29.7 |
| 4,435,511 | 3/1984 | Weaver ........................... 360/122 |
| 4,536,203 | 8/1985 | Kramer .............................. 65/29 |
| 4,642,720 | 2/1987 | Kishine et al. .................. 360/126 |
| 4,644,431 | 2/1987 | Kishine et al. .................. 360/122 |

FOREIGN PATENT DOCUMENTS

| 108355 | 5/1984 | European Pat. Off. . |
| 121781 | 10/1984 | European Pat. Off. ............ 423/449 |
| 59-84325 | 5/1984 | Japan . |
| 59-144019 | 8/1984 | Japan . |

Primary Examiner—John E. Kittle
Assistant Examiner—Susan S. Rucker
Attorney, Agent, or Firm—Cushman, Darby & Cushman

[57] ABSTRACT

The present invention concerns a glass-like carbon material which may be bonded to other materials, the carbon material having a high thermal expansion coefficient and being highly applicable for use as a slider part for a recording medium.

9 Claims, 1 Drawing Sheet

GLASS-LIKE CARBON MATERIAL, METHOD FOR MANUFACTURING THE SAME, AND SLIDER PART FOR USE WITH A RECORDING MEDIUM

BRIEF SUMMARY OF THE INVENTION

The present invention concerns glass-like carbon materials, and more particularly it concerns glass-like carbon materials with extremely hiqh thermal expansion coefficients, a method for manufacturing the same, and its uses.

Generally, when a hardened thermosetting insoluble resin, formed in a three-dimensional network structure, is carbonized in an inert gas atmosphere, a glass-like carbon material having excellent gas impermeability, hardness and isotropic structure is obtained. Such glass-like carbon materials are light in weight and excellent in heat resistance, corrosion resistance and have lubricating properties similar to conventional carbon materials. In addition, they demonstrate excellent electric and thermal conduction and good mechanical strength. Such glass-like materials are homogeneous and do not generate carbon dust when used as a component of sliding members. Thus, an extensive range of use is expected for this material in various fields including electronics, atomic power and space industries. Compared to conventional types of carbon materials and sintered fine ceramics, the composition of the present invention is homogenous and is easy to fashion to precise tolerances. Even extremely small parts can be finished with excellent precision.

In the field of electronics, there is a demand for smaller and more precise parts as the demand for higher density recording increases. We shall explain the present invention by using for examplary purposes, the material when used for a magnetic head.

When manufacturing magnetic heads, a head for a floppy disc is made by assembling, for instance, a magnetic core made of soft ferrite, etc. and a structural part of a non-magnetic material. Such non-magnetic structural parts must be ground to achieve a mirror-like finish in addition to meeting the requirements for lubricity and abrasion resistance. The slider material used for a composite type magnetic head, and a thin film type magnetic head used for hard discs, must also be light in weight, in addition to the above mentioned lubricity, corrosion resistance and smoothness of the ground surface. These structural parts and slider materials are inclusively termed as the substrate for a magnetic head.

In the prior art, ceramics of the calcium titanate type ($CaTiO_3$), the barium titanate type ($BaTiO_3$) and the aluminum oxide-titanate carbide type ($Al_2O_3$-$TiC$) were used as the substrate for magnetic heads. These ceramics had some disadvantages in that their finishing properties were very bad, and they tended to easily chip and crack. The material used for a magnetic head substrate will be, of necessity, subjected to extremely fine processing in order to be made into a magnetic head. Thus, the material is required to have a small grinding resistance and superior processing properties. The material is also required to have improved abrasion resistance against the recording medium, reduced grinding resistance and denser crystalline structure when assembled as a magnetic head. The material would be even better suited if the friction coefficient against the recording material could be further lowered.

The glass-like carbon is an excellent material satisfying all these requirements, and studies on its use as a substrate for a magnetic head are being conducted. For example, disclosures of its excellent performance as a slider material for a magnetic head by taking advantage of its excellent abrasion resistance, are made in Japanese Patent Application No. 194013 of 1982 (Disclosure No. 84325 of 1984) entitled "Magnetic Head of Vertical Magnetic Recording Type" and Japanese Patent Application No. 19293 of 1983 (Disclosure No. 144019 of 1984) entitled "Substrate for Magnetic Head".

Organic epoxy adhesives are generally employed for bonding a support, a structural part or a slider material with the core material for the magnetic head. Organic epoxy resin is expanded by air moisture, causing changes in the shape thereof and thus deteriorates the dimensional precision of the magnetic head. Hence, it becomes difficult to maintain the precision required for the magnetic head of high density recording type, and its dynamic reliability tends to become lowered.

In order to obviate such defects, bonding using low melting point glass is presently being considered. This technique employs a temperature ranging between 300° C. and 600° C.

Even when this method is used to bond the glass-like carbon material and the magnetic head core material, it is still impossible to obtain satisfactory bonding. Upon investigation, it was found that the difference in thermal expansion coefficients between the core material and the glass-like carbon material was responsible for inferior bonding. The thermal expansion coefficient of the glass-like carbon material was found to be extremely small when compared to that of the core material. Mn-Zn ferrite (having saturated magnetic flux density Bs of 5,000 G or over), had a thermal expansion coefficient of $107 \sim 110 \times 10^{-7}$/°C. When a core, made of this ferrite, is glass-fused with conventional glass-like carbons, the magnetic characteristics become affected by the generated strains, and the assembly of a magnetic head is often hindered by cracks and exfoliations.

The present invention offers glass-like carbon materials with an extremely large thermal expansion ratio, and also offers a sliding part for use with a recording medium using the same.

One aspect of the present invention concerns a glass-like carbon material characterized by an extremely large thermal expansion ratio compared to conventional glass-like carbon materials. The glass-like carbon material according to the present invention has the mean thermal expansion coefficient at 25° C.~400° C. of $60 \times 10^{-7}$/°C.~$110 \times 10^{-7}$/° C.

The glass-like carbon material according to the present invention is non-graphitized carbon which has an isotropic structure with its fractured section being glass-like and gas impermeable. These properties can be confirmed by such known methods as X-ray defraction and Raman spectroscopy.

The thermal expansion coefficient of the glass-like carbon material may be determined by measuring specimens of a prescribed size with a Thermal Mechanical Analyzer (TMA), and by use of thermal expansion measurement using lasers.

A second aspect of the present invention concerns a method of manufacturing the above mentioned glass-like carbon material. The method includes a thermosetting resin being heat-processed at the temperature range of 300° C. through 750° C., and then heat processed at a temperature above 800° C. in an inert atmosphere by applying a pressure of 1,000 atmospheres or more. In order to prevent minute void formation during carbonization, the non-uniform constituents in the material thermosetting resin must be eliminated, and carbonization for a prescribed period of time must be performed under pressurized conditions. It is also necessary to perform thermal decomposition under pressurized conditions for a prescribed period of time so that the microstructure of the glass-like carbon will contain strains. Carbonization is conducted at above 800° C. or more, and preferably at above 1000° C. in an inert atmosphere.

Thermosetting resin, as used herein, means an organic compound in which cross-linkage proceeds by heating alone, by heating in the presence of a catalyst, or by addition of a catalyst, and which becomes hardened and does not melt during the process. Inert atmosphere as used herein means an atmosphere comprising at least one gas selected from the group usually consisting of helium, argon, nitrogen, and hydrogen and not containing oxygen, or an atmosphere under reduced pressure or vacuum. Non-uniform constituents mean catalysts usually present as impurities, inorganic salts, monomers which are non-uniformly present, and volatile substances which are present in addition to principal ingredients of a thermosetting resin. They create non-uniform portions inside the carbon materials when carbonized. Pressurizing used herein means to apply mechanical force such as hydraulic pressure on a sealed container from outside, and to apply pressure directly or indirectly on the material which is being processed. It also means to apply isotropic pressure with the gaseous pressure inside the sealed container.

Optimally selected conditions to obtain a glass-like carbon material with an extremely large thermal expansion coefficient include: the magnitude of pressure being applied, the period for pressurizing, the carbonizing temperature of the thermosetting resin at the time pressurizing is started and the final temperature during the pressurizing.

HIP processing (hot isostatic pressing) is particularly preferred for pressurizing. HIP processing applies the pressure of an inert gas on the subject being processed at a high temperature in order to carbonize the object by taking synergistic advantage of high isotropic pressure and high temperature. The temperature conditions for increasing the thermal expansion coefficient or the temperature for carbonizing thermosetting resins, is above 300° C., or preferably above 500° C. More preferably, the temperature may be 600° C. or higher but below 750° C.

Carbonizing at 1000 atmospheres of pressure or higher, or more preferably at 1500 atmospheres of pressure or higher, and at the temperature of 800° C. or higher, or more preferably at 900° C. or higher, and ideally at 1000° C. or higher, will obtain the desired glass-like carbon material.

Thermosetting resins used in the present invention are phenol, epoxy, unsaturated polyester, furan, urea, melamine, alkyd, xylene, etc. and they may be used singly or blended or copolymerized.

Thermosetting resins, produced by a denaturing process include: the phenol and furan mentioned above; naturally produced substances with high carbon yield such as asphalt or pitch; and hydrophilic materials with a comparatively high carbon yield such as lignin, cellulose, tragacanth, gum arabic, humic acid, and sugars.

Fillers may be mixed in during production of glasslike carbon materials. Such fillers include carbon materials containing the thermosetting resins such as polyacrylonitrile carbons, cellulose carbons, lignin carbons, phenolic resin carbons, alkyd resin carbons, unsaturated polyester carbons, xylene resin carbons, various graphites, carbon blacks, etc. in all forms such as fibrous, particulate, powdered, and lumpy. It is necessary, however, to caution against generation of non-uniform portions by thermal decomposition when mixing in the fillers as mentioned above.

The thermosetting resins used in the present invention may be processed to desired glass-like carbon materials by molding the resins into prescribed shapes by prescribed molding methods depending on the intended use of the hardened resins, and heat processing under normal pressure, followed by high temperature under high pressure, processing.

The glass-like carbon material according to the present invention may have its thermal expansion coefficient adjusted up to $110 \times 10^{-7}/°C$. As a material with a high thermal expansion coefficient is used for cores of magnetic heads matching the trend toward higher density recordings, the glass-like like carbon material to be bonded to such core materials should have a thermal expansion coefficient of $60 \times 10^{-7}/°C$. or more, and more preferably that of $70 \times 10^{-7}/°C$. or more.

The third aspect of the present invention concerns a sliding member for a recording medium which contacts the recording medium and slides in relation therewith. The member is characterized in that it is formed with glass-like carbon having a mean thermal expansion coefficient of between $60 \times 10^{-7}/°C$. and $110 \times 10^{-7}/°C$. at a temperature between 25° C. and 400° C. Sliding parts are exemplified by a structural part of a magnetic head or a slider.

The glass-like carbon material according to the present invention can be finished to have an extremely smooth mirror-like surface. When a coating is provided on a thus finished surface by vacuum deposition or sputtering, the coating on a conventional type glass-like material is easily peeled off when subjected to subsequent heat treatment. But a coating on the present glass-like carbon material does not peel away. When the present glass-like material is bonded to a material with a high thermal expansion coefficient, no strains are generated, particularly in glass bonding, so long as the thermal expansion coefficients are essentially equal between the two materials. Fine mechanical bonding can also be obtained.

The glass-like carbon material according to the present invention has excellent properties not evident in conventional glass-like carbon materials.

The glass-like carbon material according to the present invention is characterized by its high thermal expansion coefficient of $110 \times 10^{-7}/°C$. at maximum. Such coefficients for conventional glass-like carbon material are only $50 \times 10^{-7}/°C$. at maximum. Although the thermal expansion coefficient of other graphites and carbon materials are known to exceed this value, they are defective in uniformity and do not possess fine finishing properties.

The thermal expansion coefficient of glass-like carbon materials according to the present invention may be set at a value by suitably selecting the method of preparation, and at least one objective of the present invention is to match the thermal expansion coefficient with that of the material to be bonded.

The glass-like carbon material according to the present invention may be bonded without causing internal strains to materials, particularly those having an expansion coefficient within the range of $60\times10^{-7}$ to $110\times10^{-7}/°C$. or approximate thereto. Generally speaking, when materials with slightly different thermal expansion coefficients are to be bonded together, highly reliable bonding is possible. The thermal expansion coefficient of the glass-like carbon material according to the present invention can be completely or substantially completely matched with thermal expansion coefficients of metals, alloys and metallic compounds such as ferrite, and other materials. Thus, the present invention enables glass bonding of a high reliability, and forming a functional film without creating strains on a smooth surface. This in turn enables development of electronic parts provided with the properties of such glass-like carbon material and other functional materials. The present invention is therefore advantageous for development of multi-functional parts.

The glass-like carbon material according to the present invention can be ground to a mirror-finish, and therefore it is possible to set the thermal expansion coefficient at a suitable value and to form an excellent film on its surface by vacuum deposition or sputtering. These may be used for a magnetic head substrate, magnetic head slider, or non-magnetic protective member of a slider part for floppy discs or VTR, and extremely thin substrate such as a film support for magnetic head of a magnetic disc. It may also be used for abrasion resistant slider parts used in general precision/electronic parts or electronic material in highly integrated or highly dense parts.

These as well as other objects and advantages of this invention will be better understood by reading the following more detailed description of the embodiments of the invention taken in conjunction with the accompanying drawings, of which:

DETAILED DESCRIPTION OF THE INVENTION

The present invention is now explained by referring to embodiments of the present invention, but the embodiments shown are for illustration purposes alone and not for limitation of the technical scope of the invention. The word "Parts" as used hereinunder means "parts by weight".

EMBODIMENT 1

I. Preparation of Glass-Like Carbon Material

To 100 parts of furfuryl alcohol (available from KAO Quaker) is added 5 parts of aqueous solution of 0.011N-HCl, and the resultant mixture is reacted for 6 hours at 95° C., and then dehydrated under reduced pressure. To 100 parts of the thus obtained furfuryl alcohol initial condensate resin is added 1.5 parts of aqueous solution of 70% p-toluenesulfonic acid and the resultant mixture is stirred well, poured into a rectangular mould having 3 mm thickness, and then defoamed under reduced pressure. The product was then heated for 3 hours at 50°~60° C. and for 5 hours at 90° C. The rectangular hard resin obtained is placed in a tubular furnace, heated to 600° C. in nitrogen current at 10° C./hour, maintained for 2 hours at 600°C., and then cooled to obtain glass-like carbon precursor. The glass-like carbon precursor is inserted into a specimen chamber of a hot isostatic pressing device (generally called "HIP device"), and treated for 2 hours at 1,200° C. and under 1,500 atmospheric pressure. A glass-like carbon material with an apparent specific gravity of 1.51 and thermal expansion coefficient of $60\times10^{-7}/°$ C. was obtained.

II. Preparation of Core Support

The glass-like carbon material obtained in the above mentioned step is then ground with aluminum oxide obtained in a thin sheet form of 0.1 mm thickness and surface roughness Ra of 0.05 $\mu$m. The glass-like carbon sheet is used as a support for a core which is a structural member of a magnetic head.

III. Preparation of Core for the Magnetic Head

The alloy containing Co, Fe, Mn, Si, and B at the ratio by weight of 71.5:2.5:3.0:8.0:15.0 were rolled into a thin sheet. Diffraction pattern of this alloy by an X-ray diffraction device revealed that the alloy did not contain sharp peaks unique to crystals and confirmed that the alloy was amorphous.

The amorphous alloy sheet was then ground with aluminum oxide of 1~3 $\mu$m grain diameter, corroded in an etching solution containing 60 g $FeCl_3.6H_2O$, 40 ml of $C_2H_5OH$ and 2 mg of $CuCl_3$ dissolved in 40 ml of water, and ground with polishing cloth to achieve the final thickness of 30 $\mu$m. This amorphous alloy film is used as a core for a magnetic head.

IV. Preparation of Magnetic Head

Figure 1:
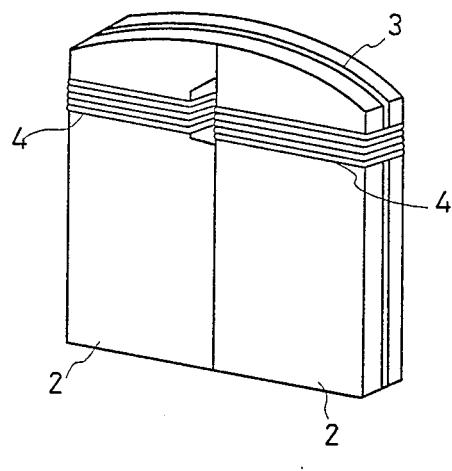
FIG. 1 is a perspective view of a magnetic head according to one embodiment of the present invention.
Figure 2:
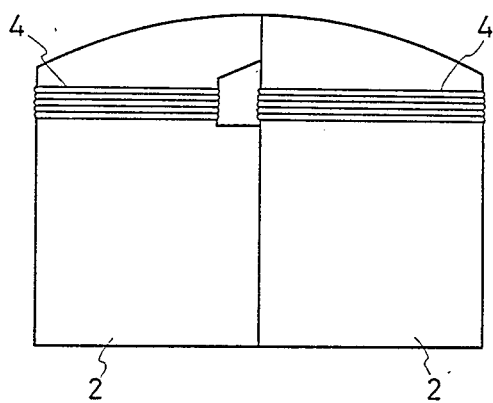
FIG. 2 is a front view thereof.
Figure 3:
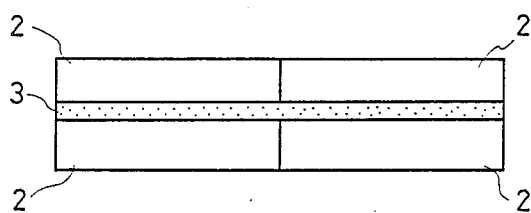
FIG. 3 is a plan view thereof.

The thin glass-like carbon sheet prepared in the step II above and the amorphous alloy film prepared in the step III above were cut out in predetermined shapes and dimensions, bonded together with an epoxy adhesive (available from Ciba Geigy; product name: Araldite; bonding temperature: 120° C.) and wound With 15 turns of copper wire (diameter 40 $\mu$m) coated with an insulating layer, to prepare a magnetic head shown in FIGS. 1 to 3. FIGS. 1 to 3 respectively show the perspective view, the front view and the plan view thereof. The core support (2) is formed of glass-like carbon material, the core (3) of amorphous alloy and wound with coil (4).

In the present embodiment, the core (3) was made from a thin amorphous alloy sheet, but it is also possible to laminate amorphous alloy film on the glass-like carbon substrate by sputtering, and to bond and wire the same to obtain a magnetic head.

EMBODIMENT 2

The glass-like carbon precursor prepared similarly to Embodiment 1 is inserted into a specimen chamber of an HIP device, and treated for 2 hours a 1100° C. under 2000 atmospheres of pressure. The glass-like carbon material obtained, had the apparent specific gravity of 1.54 and the thermal expansion coefficient of $90\times10^{-7}/°C$. A magnetic head was prepared from this material in a manner similar to Embodiment 1. The surface roughness Ra of the ground surface of the glass-like carbon material is 0.05 $\mu$m, and low melting point glass was used for bonding (bonding temperature: 300° C.).

EMBODIMENT 3

Using the same glass-like carbon material as in Embodiment 2, a magnetic head similar to that of Embodiments was prepared using Ni-Zn ferrite as a core. The low melting point glass used for Embodiment 2 was used for bonding.

COMPARATIVE EMBODIMENT 1

Using the cyanoacrylate adhesive, a magnetic head similar to that of Embodiment 2 was prepared.

COMPARATIVE EMBODIMENT 2

Using low melting point glass used for Embodiment 2 as an adhesive, a magnetic head similar to that of Embodiment 1 was prepared.

COMPARATIVE EMBODIMENT 3

A magnetic head similar to that of Comparative Embodiment 1 was prepared using Ni-Zn ferrite as a core.

COMPARATIVE EMBODIMENT 4

A rectangular sheet of thermosetting resin obtained in Embodiment 1 was treated by heating up to 1100° C. without using the HIP device, to obtain a glass-like carbon material of apparent specific gravity of 1.49 and thermal expansion coefficient of $40 \times 10^{-7}/°C$. Using this glass-like carbon material and the low melting point glass used in Embodiment 2 as an adhesive, a magnetic head similar to that of Embodiment 1 was prepared.

COMPARATIVE EMBODIMENT 5

A magnetic head similar to that of Comparative Embodiment 4 was prepared using Ni-Zn ferrite as a core. The core and the core support became peeled and it was not usable as a magnetic head.

TEST EXAMPLE

In order to measure the degree of deterioration of the magnetic characteristics of the magnetic head core by bonding thereto the core support made of a glass-like carbon material, inductance L was measured for the magnetic head coil (4) prepared in Embodiments 1 to 3 and Comparative Embodiments 1 to 4. Cores of Comparative Embodiments 1 and 3 were considered not to have deteriorated as they were bonded at room temperature, but they were used as references in learning the original characteristics of the cores. The result is shown in the Table as the ratio $L/L_{1k}$ wherein L is inductance, and $L_{1k}$ inductance at k kHz.

TABLE

Normalized Inductance of Coils on Magnetic Heads

| Measured frequency (Hz) | $0.1 \times 10^6$ | $1 \times 10^6$ | $5 \times 10^6$ | $10 \times 10^6$ |
| --- | --- | --- | --- | --- |
| Embodiment 1 | 1.0 | 1.0 | 0.9 | 0.5 |
| Embodiment 2 | 1.0 | 1.0 | 0.9 | 0.6 |
| Embodiment 3 | 1.0 | 1.0 | 0.7 | 0.3 |
| Comparative Embodiment 1 | 1.0 | 1.0 | 0.9 | 0.6 |
| Comparative Embodiment 2 | 1.0 | 0.9 | 0.6 | 0.1 |
| Comparative Embodiment 3 | 1.0 | 1.0 | 0.7 | 0.1 |
| Comparative Embodiment 4 | 1.0 | 0.8 | 0.4 | 0.1 |

As clearly shown in the table, the glass-like carbon material according to the present invention does not deteriorate the magnetic characteristics of the core when used as a core support.

EMBODIMENT 4

Five hundred parts of furfuryl alcohol and 480 parts of 92% paraformaldehyde were stirred at 80° C. and dissolved. The following constituents were added: 520 parts of phenol, 8.8 parts of sodium hydroxide and 45 parts of water drop-wise, under stirring. Upon completion of adding water, the resultant mixture was reacted for 3 hours at 80° C. This reaction product further received a mixture containing 80 parts of phenol, 8.8 parts of sodium hydroxide, and 45 parts of water, and then this was reacted for 4.5 hours at 80° C. The product was cooled to 30° C., and neutralized with an aqueous solution of 0.011N hydrochloric acid. The neutralized product was then dehydrated under reduced pressure to remove 150 parts of water, and then 500 parts of furfuryl alcohol were added. To 100 parts of resin thus obtained was added 2.4 parts of 70% p-toluenesulfonic acid aqueous solution, and the resultant mixture was stirred well, poured into a rectangular sheet-shaped mold of 3 mm thickness, and defoamed under reduced pressure. The mixture was then heated for 3 hours at 50°~60° C., for 5 days at 90° C. A rectangular sheet of hardened resin thus obtained was placed in a tubular furnace, heated to 700° C. at 10° C./hour in argon gas current, maintained for 2 hours at 700° C., and then cooled to obtain a glass-like carbon precursor.

The glass-like carbon precursor was treated at 1200° C. under 2000 atmospheres of pressure using an HIP device to obtain a glass-like carbon material with a thermal expansion coefficient of $102 \times 10^{-7}/°C$.

The glass-like carbon material thus obtained was used to form a core support and made into a magnetic head similar to thatof Embodiment 3. The impedance of the measured magnetic head did not reveal any deterioration of the magnetic characteristics of the core.

EMBODIMENT 5

To 100 parts of phenol were added 157 parts of 37% formaldehyde aqueous solution and 20 parts of lignin as well as 5 parts of 10% sodium hydroxide aqueous solution. The mixture was reacted while stirred for 2 hours at 80° C., and then cooled to room temperature, neutralized with 5.5 parts of 85% lactic acid, and dehydrated up to 120% under reduced pressure.

The resin thus obtained was hardened, similarly as in Embodiment 1, and the hardened resin was cut out, heated up to 600° C. in a tubular furnace, and treated at 1200° C. and under 2000 atmospheres of pressure using an HIP device. The thermal expansion coefficient of the thus obtained glass-like carbon material was $85 \times 10^{-7}/°C$.

EMBODIMENT 6

To 100 parts of furfuryl alcohol and 25 parts of 85% paraformaldehyde were added 10 parts of benzonic acid and 0.1 part of 93% NaOH, and the resultant mixture was reacted for 11 hours at 110° C.

The resin thus obtained was hardened similarly as in Embodiment 1. Hardened resin was cut out, heated to 650° C. in a tubular furnace, and processed at 1200° C. under 2000 atmospheres of pressure using an HIP device. The glass-like carbon material thus obtained had a thermal expansion coefficient of $97 \times 10^{-7}/°C$.

What is claimed is:

1. A glass-like carbon material comprising:
   a glass-like carbon material having a thermal expansion coefficient between $60 \times 10^{-7}/°C$. to $110 \times 10^{-7}/°C$. at temperature between 25° C. to 400° C., said carbon material resulting from a process including the following steps:
(a) heating a thermosetting resin at a temperature ranging between 300° C. to 750° C.; and
(b) pressurizing said resin at 1,000 atmospheres or greater, at a temperature of 800° C. or above, in an inert atmosphere.

2. A glass-like carbon material according to claim 1 wherein, said material is a non-graphitized carbon having an isotropic structure, said material having a fractured section being glass-like and gas impermeable.

3. A glass-like carbon material according to claim 1 wherein, said material comprises a heat and pressure treated thermosetting resin.

4. A glass-like carbon material according to claim 3 wherein said thermosetting resin may be present in a carbon filler material.

5. A glass-like carbon material according to claim 1 wherein said material has a very low number of minute voids.

6. A glass-like carbon material according to claim 1 wherein said carbon material is bonded to a substrate, and the thermal expansion coefficient of said carbon material is substantially matched to the thermal expansion coefficient of said substrate, causing reducing strains in the bonded material.

7. A glass-like carbon material according to claim 1, wherein the formation of minute voids in said material are prevented by the following steps:
substantially eliminating non-uniform constituents in the thermosetting resin;
performing steps (a) and (b) under pressurized conditions; and
performing steps (a) and (b) for a prescribed time up to the point of causing strains in the microstructure of said glass-like carbon material.

8. A glass-like carbon material according to claim 1 wherein, said thermosetting resin is molded into a prescribed shape.

9. A glass-like carbon material according to claim 1 wherein the glass-like carbon material is formed into a sliding part of a recording medium which contacts the recording medium and slides relative to the recording medium.

* * * * *